United States Patent
Mulliner (10) Patent No.: US 10,496,993 B1
(45) Date of Patent: Dec. 3, 2019

(54) DNS-BASED DEVICE GEOLOCATION

(71) Applicant: Square, Inc., San Francisco, CA (US)

(72) Inventor: Collin Mulliner, Brooklyn, NY (US)

(73) Assignee: Square, Inc., San Francisco, CA (US)

( * ) Notice: Subject to any disclaimer, the term of this patent is extended or adjusted under 35 U.S.C. 154(b) by 397 days.

(21) Appl. No.: 15/433,812

(22) Filed: Feb. 15, 2017

(51) Int. Cl.
*G06Q 20/40* (2012.01)
*H04W 12/12* (2009.01)
*G06Q 20/20* (2012.01)
*H04L 29/12* (2006.01)
*G06Q 20/12* (2012.01)

(52) U.S. Cl.
CPC ......... *G06Q 20/4016* (2013.01); *G06Q 20/12* (2013.01); *G06Q 20/202* (2013.01); *H04L 61/1511* (2013.01); *H04L 61/2007* (2013.01); *H04W 12/12* (2013.01)

(58) Field of Classification Search
None
See application file for complete search history.

(56) References Cited

U.S. PATENT DOCUMENTS

| | | | |
|---|---|---|---|
| 5,394,395 A | 2/1995 | Nagai et al. | |
| 5,802,341 A | 9/1998 | Kline et al. | |
| 6,192,142 B1 | 2/2001 | Pare, Jr. et al. | |
| 7,181,768 B1 | 2/2007 | Ghosh et al. | |
| 7,228,566 B2 | 6/2007 | Caceres et al. | |
| 7,444,358 B2 | 10/2008 | Paczkowski et al. | |
| 7,472,172 B2 * | 12/2008 | Anderson | H04L 29/12009 709/219 |
| 7,840,763 B2 | 11/2010 | Murotake et al. | |
| 7,941,835 B2 | 5/2011 | Wolfond et al. | |
| 8,180,917 B1 | 5/2012 | Yan et al. | |
| 8,307,099 B1 | 11/2012 | Khanna et al. | |
| 8,423,043 B2 | 4/2013 | Kazmi | |
| 8,627,414 B1 | 1/2014 | McCune et al. | |
| 8,696,765 B2 | 4/2014 | Mendez et al. | |

(Continued)

FOREIGN PATENT DOCUMENTS

WO 2018/006060 A1 1/2018

OTHER PUBLICATIONS

Ferebee, D., et al., "Security Visualization: Cyber Security Storm Map and Event Correlation," IEEE Symposium on Computational Intelligence in Cyber Security (CICS), pp. 171-178 (2011).

(Continued)

*Primary Examiner* — Allen C Chein
*Assistant Examiner* — Denisse Y Ortiz Roman
(74) *Attorney, Agent, or Firm* — Lee & Haynes, P.C.

(57) ABSTRACT

In various situations, it may be desirable to know the location of a device requesting services, and to confirm that the device is at an actual location that coincides with the purported location of the device. In order to verify that a device is actually at its purported location, the device may be instructed to perform DNS (domain name system) lookups to resolve a set of given network domain names and to thereby find network addresses that are associated with the domain names Geolocation databases are then consulted to determine the locations of the hosts associated with the network addresses. These locations are checked for consistency with the purported location of the device, and services may be denied if inconsistencies are found.

23 Claims, 5 Drawing Sheets

(56) References Cited

U.S. PATENT DOCUMENTS

| | | | |
|---|---|---|---|
| 8,805,865 | B2 | 8/2014 | Samari et al. |
| 8,826,426 | B1 | 9/2014 | Dubey |
| 8,875,286 | B2 | 10/2014 | Friedrichs et al. |
| 8,925,092 | B1 | 12/2014 | Johansson et al. |
| 8,990,121 | B1 | 3/2015 | Guise et al. |
| 8,997,230 | B1 | 3/2015 | McCauley et al. |
| 9,202,057 | B2 | 12/2015 | Mao et al. |
| 9,402,161 | B2 | 7/2016 | Marti et al. |
| 9,652,610 | B1 | 5/2017 | McCauley et al. |
| 9,734,495 | B2 * | 8/2017 | Rose ............... G06Q 20/20 |
| 9,779,449 | B2 | 10/2017 | Meyer et al. |
| 2001/0020211 | A1 | 9/2001 | Takayama et al. |
| 2002/0120871 | A1 | 8/2002 | Watkins et al. |
| 2002/0194490 | A1 | 12/2002 | Halperin et al. |
| 2003/0014664 | A1 | 1/2003 | Hentunen |
| 2003/0056076 | A1 | 3/2003 | Cook et al. |
| 2004/0030912 | A1 | 2/2004 | Merkle, Jr. et al. |
| 2004/0141547 | A1 | 7/2004 | Paquelet |
| 2005/0108495 | A1 | 5/2005 | Mckenney et al. |
| 2005/0182913 | A1 | 8/2005 | Zimmer |
| 2005/0183072 | A1 | 8/2005 | Horning et al. |
| 2005/0278535 | A1 | 12/2005 | Fortune et al. |
| 2006/0036670 | A1 | 2/2006 | Musman |
| 2006/0156011 | A1 | 7/2006 | Masui |
| 2006/0164213 | A1 | 7/2006 | Burghard et al. |
| 2006/0282660 | A1 | 12/2006 | Varghese et al. |
| 2007/0174910 | A1 | 7/2007 | Zachman et al. |
| 2007/0214088 | A1 | 9/2007 | Graham et al. |
| 2007/0240219 | A1 | 10/2007 | Tuvell et al. |
| 2007/0271457 | A1 | 11/2007 | Patil et al. |
| 2008/0091681 | A1 | 4/2008 | Dwivedi et al. |
| 2008/0167980 | A1 | 7/2008 | Aaron et al. |
| 2009/0015418 | A1 | 1/2009 | Koike |
| 2009/0031141 | A1 | 1/2009 | Pearson et al. |
| 2009/0199296 | A1 | 8/2009 | Xie et al. |
| 2009/0253408 | A1 | 10/2009 | Fitzgerald et al. |
| 2010/0107245 | A1 | 4/2010 | Jakubowski et al. |
| 2011/0047620 | A1 | 2/2011 | Mahaffey et al. |
| 2011/0078034 | A1 | 3/2011 | Hayhow |
| 2011/0078791 | A1 | 3/2011 | Prakash et al. |
| 2011/0093920 | A1 | 4/2011 | Etchegoyen |
| 2011/0214184 | A1 | 9/2011 | Whitehouse et al. |
| 2011/0247045 | A1 | 10/2011 | Rajagopal et al. |
| 2011/0265182 | A1 | 10/2011 | Peinado et al. |
| 2011/0314145 | A1 | 12/2011 | Raleigh et al. |
| 2012/0030763 | A1 | 2/2012 | Adams |
| 2012/0084203 | A1 | 4/2012 | Mehew et al. |
| 2012/0144493 | A1 | 6/2012 | Cole et al. |
| 2012/0167162 | A1 | 6/2012 | Raleigh et al. |
| 2012/0210423 | A1 | 8/2012 | Friedrichs et al. |
| 2012/0210431 | A1 | 8/2012 | Ståhlberg et al. |
| 2012/0216242 | A1 | 8/2012 | Uner et al. |
| 2012/0310830 | A1 | 12/2012 | Paulsen et al. |
| 2012/0311322 | A1 | 12/2012 | Koyun et al. |
| 2012/0324557 | A1 | 12/2012 | Rubin et al. |
| 2012/0331553 | A1 | 12/2012 | Aziz et al. |
| 2013/0097652 | A1 | 4/2013 | Bhattacharjee et al. |
| 2013/0111591 | A1 | 5/2013 | Topan et al. |
| 2013/0117854 | A1 | 5/2013 | Britton et al. |
| 2013/0217333 | A1 | 8/2013 | Sprigg et al. |
| 2013/0226717 | A1 | 8/2013 | Ahluwalia et al. |
| 2013/0305368 | A1 | 11/2013 | Ford |
| 2013/0312098 | A1 | 11/2013 | Kapoor et al. |
| 2014/0129596 | A1 | 5/2014 | Howe |
| 2014/0201126 | A1 | 7/2014 | Zadeh et al. |
| 2014/0337243 | A1 | 11/2014 | Dutt et al. |
| 2015/0026479 | A1 | 1/2015 | Yi et al. |
| 2015/0033227 | A1 | 1/2015 | Lin et al. |
| 2015/0066769 | A1 | 3/2015 | Tallal, Jr. |
| 2015/0088744 | A1 | 3/2015 | Raduchel |
| 2015/0140962 | A1 | 5/2015 | Mapes |
| 2015/0177010 | A1 | 6/2015 | Abramson et al. |
| 2015/0254606 | A1 | 9/2015 | Bhalodia et al. |
| 2015/0356003 | A1 | 12/2015 | Koh et al. |
| 2015/0378895 | A1 | 12/2015 | Gschwind et al. |
| 2018/0005230 | A1 | 1/2018 | Zovi et al. |
| 2018/0005243 | A1 | 1/2018 | Zovi et al. |

OTHER PUBLICATIONS

Hosseini, Z., Z., and Barkhordari E., "Enhancement of security with the help of real time authentication and one time password in e-commerce transactions," The 5th Conference on Information and Knowledge Technology, IEEE, pp. 268-273 (2013).
Final Office Action dated Sep. 18, 2018, for U.S. Appl. No. 14/709,250, of Zovi, D., D., et., al., filed May 11, 2015.
Final Office Action dated Nov. 2, 2018, for U.S. Appl. No. 13/800,670, of McCauley, N., et, al., flied Mar. 13, 2013.
"Maximum lifetime for user ticket," Microsoft, published May 8, 2012, Retrieved from the Internet URL: https://technet.microsoft.com/en-us/library/jj852169(v=ws.11).aspx, on Sep. 21, 2017, pp. 1-3.
Rowley, J., "How Short-Lived Certificates Improve Certificate Trust," DigiCert Blog, published Feb. 4, 2016, Retrieved from the Internet URL: https://www.digicert.com/blog/short-lived-certificates/, on Sep. 21, 2017, pp. 1-5.
Non-Final Office Action dated Aug. 13, 2014, U.S. Appl. No. 13/800,587, of McCauley, N., et al., filed Mar. 13, 2013.
Notice of Allowance dated Jan. 22, 2015, U.S. Appl. No. 13/800,587, of McCauley, N., et al., filed Mar. 13, 2013.
Non-Final Office Action dated Mar. 3, 2015, U.S. Appl. No. 13/800,670, of McCauley, N., et al., filed Mar. 13, 2013.
Final Office Action dated Sep. 11, 2015, for U.S. Appl. No. 13/800,670, of McCauley, N. et al., filed Mar. 13, 2013.
Non-Final Office Action dated Oct. 7, 2015, for U.S. Appl. No. 14/631,724, of McCauley, N., et al., filed Feb. 25, 2015.
Advisory Action dated Jan. 20, 2016, for U.S. Appl. No. 13/800,670, of McCauley, N., et al., filed Mar. 13, 2013.
Final Office Action dated Mar. 10, 2016, for U.S. Appl. No. 14/631,724, of McCauley, N., et al., filed Feb. 25, 2015.
Advisory Action dated May 27, 2016, for U.S. Appl. No. 14/631,724, of McCauley, N., et al., filed Feb. 25, 2015.
Non-Final Office Action dated Jul. 18, 2016, for U.S. Appl. No. 14/631,724, of McCauley, N., et al., filed Feb. 25, 2015.
Notice of Allowance dated Jan. 13, 2017, for U.S. Appl. No. 14/631,724, of McCauley, N., et al., filed Feb. 25, 2015.
Non-Final Office Action dated Nov. 1, 2017, for U.S. Appl. No. 13/800,670, of McCauley, N., et al., filed Mar. 13, 2013.
Non-Final Office Action dated Feb. 16, 2018, for U.S. Appl. No. 14/709,250, of Zovi, D.D., et., al., filed May 11, 2015.
International Search Report and Written Opinion for International Application No. PCT/US2017/040460, dated Sep. 29, 2017.
Advisory Action dated Jan. 28, 2019, for U.S. Appl. No. 14/709,250, of Zovi, D.D., et., al., filed May 11, 2015.
Notice of Allowance dated Mar. 20, 2019, for U.S. Appl. No. 15/199,917 of Zovi, D.D., et al. filed Jun. 30, 2016.
Non-Final Office Action dated Mar. 21, 2019, for U.S. Appl. No. 15/631,858, of Rohlf, C., filed Jun. 23, 2017.
Ex-Parte Quayle Action dated Apr. 19, 2019, for U.S. Appl. No. 15/199,933, of Zovi, D.D., et al., filed Jun. 30, 2016.
Notice of Allowance dated May 1, 2019, for U.S. Appl. No. 13/800,670, of McCauley, N., et al., filed Mar. 13, 2013.
Notice of Allowance dated May 24, 2019, for U.S. Appl. No. 15/199,917 of Zovi, D.D., et al., filed Jun. 30, 2016.

* cited by examiner

DNS-BASED DEVICE GEOLOCATION

BACKGROUND

The process of determining the location of a user's computing device is sometimes referred to as geolocation. There are many types of Internet-based applications that use or rely on geolocation. Many social network applications, for example, allow a user to report or "check in" using his or her current location. Other applications may provide different features or different configurations for users in different geographic locations, or may disable certain functions depending on the locations of users.

Geolocation is also an important aspect of certain risk monitoring and fraud prevention tools. As a simple example, a credit card processing service may attempt to determine whether or not an order is being placed from near a customer's reported shipping address and if not, the order may be flagged as having a relatively higher probability of being fraudulent.

There are various ways to determine or estimate the actual location of a computing device. In some situations, for example, the device may be asked to provide its GPS (Global Positioning System) coordinates. However, it is possible for a fraudster to defeat certain types of geolocation techniques and to cause a device to report a location other than its actual location.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for estimating the geographic location of a device or the geographic region within which a device is located. The techniques can be used to estimate locations of devices that are being used to conduct financial transactions, as an example. In the described embodiments, the techniques are used to detect the possibility of fraudulent financial transactions by users who might falsely purport to be in a particular location or geographic region. The described techniques can be used in conjunction with various other risk assessment techniques that together produce metrics indicating the likelihood that any particular transaction is fraudulent. The techniques can also be used in other situations and for other purposes, such as for social media check-ins, for customization or limitation of application features depending on geographic location, for providing locale-specific information, etc.

In a described embodiment, a merchant uses a POS (point-of-sale) application to facilitate purchase transactions with customers. The POS application may run on a device, referred to herein as a merchant device or POS device, such as a tablet computer, a smartphone, or a desktop computer, for example. The POS application may be used to accept and process credit cards and other payment instruments from customers in conjunction with purchases.

The POS application may be supported by an online merchant support service, and the POS application may communicate with the merchant support service through the Internet or through another wide-area network. The merchant support service may provide various services for the merchant through the POS application, such as order entry, check-out support, credit-card payment processing, accounting, inventory management, employee time scheduling, payroll, and/or other services.

In order to detect fraud, the merchant support service may attempt to verify the identity of the merchant and to detect situations in which an unauthorized entity is posing as an authorized merchant or situations in which an otherwise authorized merchant is acting in an unauthorized fashion. As part of various steps that may be taken to ensure that the POS application and its user are authorized, the merchant support service may attempt to verify the geographic location from which the POS application is operating, and to compare it to the purported location of the merchant. If the POS application is operating from a geographic location that is different than its purported or authorized location, services may be denied to the POS application.

In order to estimate the geographic location from which the POS application is operating, the merchant support service may send a list of Internet domain names for resolution by the POS application. Domain names are alphanumeric strings that correspond to Internet entities and that are used to navigate to the websites of various different Internet merchants, providers, services, etc. For example, "google.com" and "wikipedia.org" are well-known domain names that are used in conjunction with widely available Internet services.

In response to receiving a list of domain names, the POS application resolves the domain names to their numerical IP (Internet Protocol) addresses. Numerical IP addresses, which are used for routing traffic on the Internet, are of the format xxx.xxx.xxx.xxx, where each "x" represents a numeral. The numerical IP addresses are associated respectively with corresponding network servers, also referred to as network hosts.

The POS application is configured to use networking components of the POS to resolve or look up the IP addresses that correspond to the given domain names. The operating system of the POS device may maintain various configuration settings, which may include a designation of a DNS (Domain Name System) server that the device is to use for resolving domain names. The operating system may also have what is referred to as a domain name resolver or DNS resolver, which can be called by the POS application When called, the DNS resolver queries the DNS server identified in the configuration settings of the operating system in order to identify an IP address corresponding to a given domain name.

The POS application uses the DNS resolver of the device operating system to look up the IP addresses of the given domain names, and then returns the IP addresses to the merchant support service.

Upon receiving the resolved IP addresses, the merchant support service performs geolocation lookup on the IP addresses to determine a location for each of the IP addresses. IP geolocation can be based on available IP address geolocation databases that give location information corresponding to any given IP address. More specifically, for each IP address, the database lists a corresponding physical location from which a network host having that IP address is believed to be operating from. The locations corresponding respective IP addresses will be referred to as IP address locations in the following discussion.

IP address locations may be specified with varying degrees of resolution. For example, each location may be specified by geographical coordinates, by a street address, by the name of a city, county, region, etc.

The IP address locations obtained in this manner can be compared to the purported location of the POS device for consistency. For example, the IP address locations can be compared to ensure that all or most of the IP address locations are within or near the same general geographic region as the purported region of the POS device and POS application. Any inconsistencies can be taken as an indication of a relatively higher probability of fraud, and services can be denied if the probability exceeds a threshold risk level.

The IP address locations can also be used more generally to estimate a location of the POS device. For example, the geographic center of the determined IP address locations can be taken as the estimated location of the POS device. As another example, where the IP address locations are given as regions, an area where the regions overlap may be determined, and the location of the POS device may be assumed to be within this area or at the geographic center of this area.

In some embodiments, the POS application may also measure signal propagation times between the POS device and the network hosts having the IP addresses identified using the DNS lookup services. The signal propagation measurements or times may be reported to the merchant support service, which may use the propagation times in combination with the IP address locations to determine the location of the POS device. For example, rather than calculating the geographic center of the locations, the merchant support service may calculate a location that is between the IP address locations, such that the distances between the location and the IP address locations are proportional to the corresponding propagation times.

Figure 1:
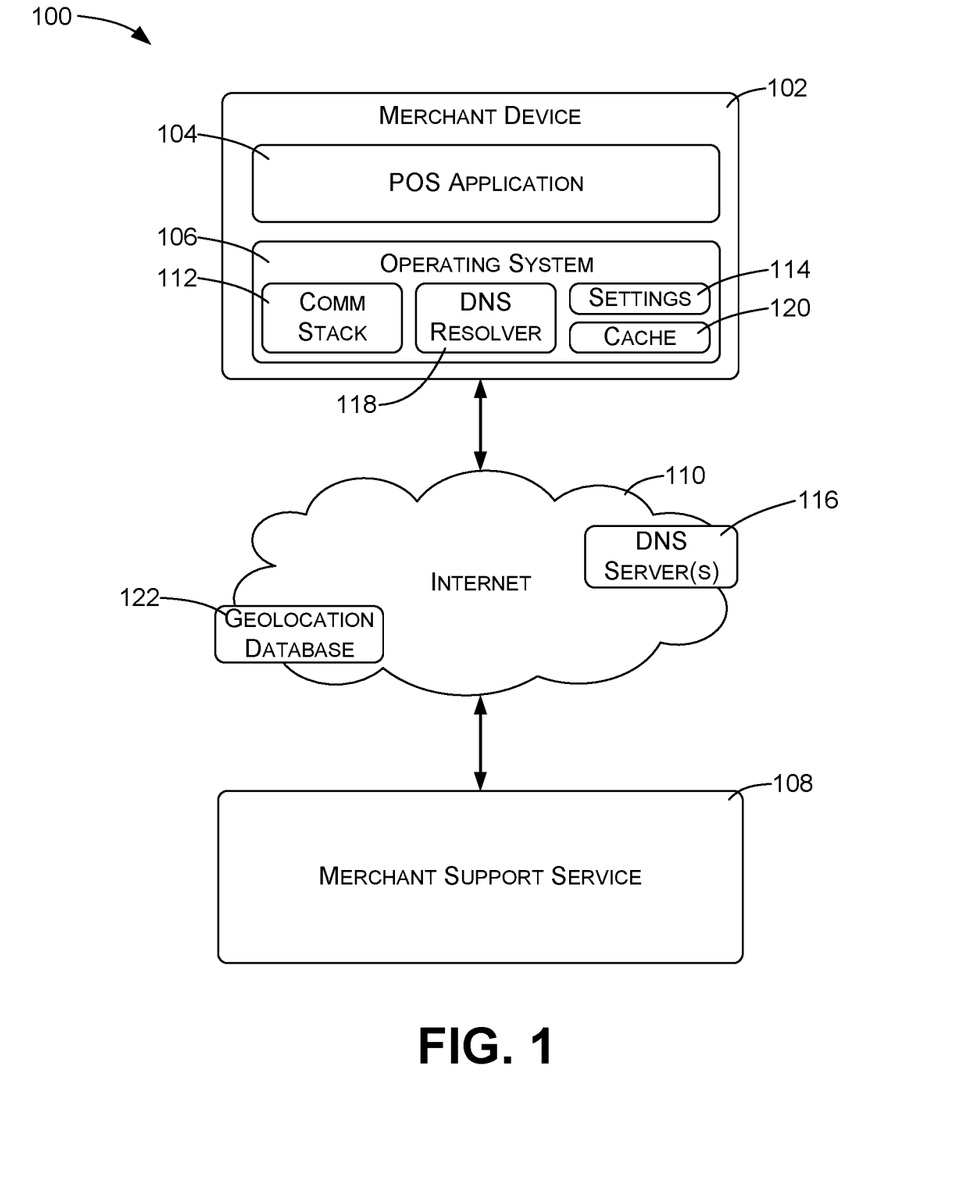
FIG. 1 is a block diagram illustrating an example transaction support system in which the location of a merchant device is to be verified.

FIG. 1 shows an example system 100 that may be configured to use the described techniques. FIG. 1 shows a merchant device 102, which may also be described herein as a POS device 102. The merchant device 102 may comprise any sort of mobile or non-mobile device having a display or other means for presenting information to a merchant and for receiving input from the merchant. For example, the merchant device 102 may comprise a smartphone or tablet computer having a touch-sensitive graphics display surface that displays information and receives user input. More generally, the merchant device 102 may comprise any of various types of devices, including registers, terminals, desktop computers, laptop computers, mobile computing devices, etc.

A POS application 104 may be installed to execute on the merchant device 102. The merchant device 102 may also have an operating system 106 that manages hardware and software of the POS device 102, as well as providing common services for use by applications such as the POS application 104. As will be described in more detail below, such common services may support network communications and may include utilities for resolving Internet domain names.

The POS application 104 may be supported by an online merchant support service 108 that is accessible via a wide-area network such as the Internet 110. Generally, network communications between the POS application 104 and the merchant support service 108 may utilize any one or more wired or wireless networking technologies, such as Ethernet, Wi-Fi, and/or cellular communication technologies, and may include both public and private networks.

The merchant support service 108 may be implemented by multiple server computers (not shown) that run software for providing functionality that is useful to merchants, and that is accessed using the POS application 104. The merchant support service 108 may in some cases comprise a large-scale service that supports many merchants and many POS devices, which may be distributed across large geographic areas.

In combination, the POS device 102, the POS application 104, and the merchant support service 108 provide various functionality that may be useful for merchant operations, such as order entry, check-out support, credit-card payment processing, accounting, inventory management, employee time scheduling, payroll, and/or other services.

In the described embodiments, the merchant support service 108 is responsible for core system functionality. The POS application 104 takes the role of a client that exposes a user interface and that allows for other local input/output functionality such as reading credit cards and displaying reports. However, some embodiments may distribute the functionality of the system 100 in different ways, and the merchant device 102 and/or other devices local to the merchant environment may be responsible for some or all aspects of system functionality.

Among various different types of services, the system 100 may provide POS services enabling the merchant (e.g., an owner, employees, etc.) to accept payments from a customer. When paying for a purchase, the customer offers a payment instrument (e.g., a debit card, a credit card, a stored-value or gift card, a check, through an electronic payment application on a device carried by the customer, or the like). The merchant interacts with the merchant device 102 and the POS application 104 to process the payment, such as by inputting (e.g., manually, via a magnetic card reader or an RFID reader, etc.) an identifier associated with the payment instrument. For example, a payment instrument of the customer may include one or more magnetic strips for providing card and customer information when swiped in a card reader. In other examples, other types of payment cards may be used, such as smart cards having built-in memory chips that are read by the merchant device 102 and POS application 104 when the cards are "dipped" into the reader, radio frequency identification tags, or so forth.

In order to complete a purchase transaction, the POS application 104 determines transaction information describing the transaction, such as the identifier of the payment instrument, an amount of payment to be made by the customer, the items acquired by the customer, etc. The merchant support service 108 receives the transaction information from the POS application 104 and attempts to authorize a payment instrument specified by the transaction information. Upon authorization, the merchant support service 108 sends an indication of whether the payment instrument has been approved or declined back to the POS application 104, and further steps are taken to complete the transaction and to initiate an actual transfer of funds from an account of the customer to an account of the merchant.

Among other components and services, the operating system 106 of the merchant device 102 may implement a network communications stack 112 that the POS application 104 and other applications may use to communicate over the Internet 110 and/or other networks with various websites, servers, and services, including the merchant support service 108. The network communications stack 112 is typically configured with settings 114 that include things such a local IP address of the merchant device 102, the IP address of a local network gateway, and the IP addresses of one or more DNS servers 116. The network communications stack 112 may also include or may be associated with a DNS resolver 118 that performs DNS lookups to resolve Internet domain names. The DNS resolver 118 may maintain a DNS cache 120 of IP addresses corresponding to recently resolved domain names. The DNS resolver 118 in the described embodiments is available for use by applications such as the POS application 104.

In operation, the merchant support service 108 attempts to verify the location of the merchant device 102 prior to allowing a financial transaction requested by the POS application 104. More specifically, the merchant support service 108 may attempt to estimate the region within which the merchant device 102 is operating by asking the POS application 104 to perform DNS lookup for a set of given domain names, using the one or more DNS servers 116 specified by the settings 114 of the merchant device 102. In response, the POS application 104 calls the DNS resolver 118 to resolve the given domain names, and provides the resulting IP addresses back to the merchant support service 108.

Upon receiving the resolved IP addresses, the merchant support service 108 references a geolocation database 122 to determine a location corresponding to each of the resolved IP addresses. These locations are then compared to the purported location of the merchant device 102. If there is a discrepancy between the purported location of the merchant device 102 and the locations corresponding to the resolved IP addresses, the merchant support service 108 may deny services to the POS application 104.

The geolocation database 122 may be a publicly available database maintained by a third-party provider that has compiled geographic information for various IP addresses using various means. Alternatively, the merchant support service 108 may create the geolocation database 122 over time by noting the reported locations of many different merchant devices and comparing the reported locations with the resolved IP addresses returned by the merchant devices. Locations for IP addresses indicate the locations from which network hosts having the IP addresses are believed to be operating.

The IP address locations may be indicated with varying degrees of precision. For example, a particular location may be given in terms of geographical coordinates, as a street address, as a city, as a state, as a country, as a geographic region, etc. Furthermore, any given IP address location may be generalized by the merchant support service 108 to include a larger region such as the city, state, country, or continent that encompasses the location.

Figure 2:
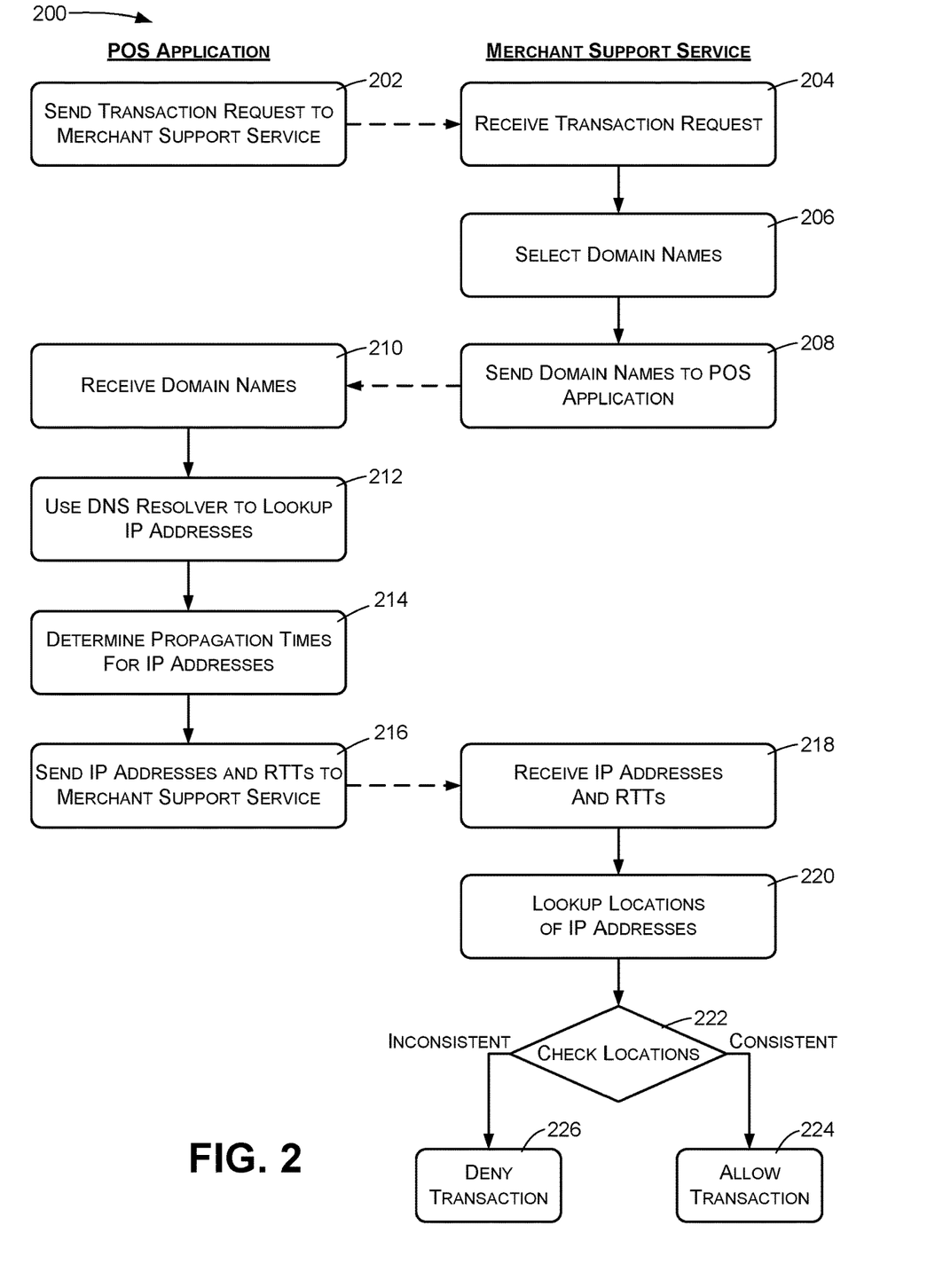
FIG. 2 is a flow diagram illustrating an example method of verifying the purported location of a merchant device prior to providing services to the merchant device.

FIG. 2 illustrates an example method 200 of providing financial transaction services to a requesting client while also checking that the client is within a particular geographic region. For purposes of discussion, the method 200 will be described with reference to the components of FIG. 1, although the method 200 may also be performed in other environments. The actions illustrated along the left side of FIG. 2 are performed by the merchant device 102 and/or the POS application 104. The actions illustrated along the right side of FIG. 2 are performed by the merchant support service 108.

In the example of FIG. 2, the POS application 104 is being used by an entity purporting to be an authorized user of the POS application 104 and of the merchant support service 108. The entity and the POS application 104 have indicated that they are located within a purported geographic region. The purported geographic region may comprise a street address, a city, a state, a county, a province, a country, a continent, a multi-country region, or any other geographic area that might be indicated at a given degree of specificity.

An action 202, performed by the POS application 104 in response to interactions with a merchant and/or a customer of the merchant, comprises sending a transaction request to the merchant support service 108. The transaction request may be for initiation or approval of a funds transfer from the customer to the merchant, for example, for a purchase transaction that is being conducted between the merchant and the customer. The transaction request may specify various information relating to the purchase transaction, such as a purchase amount, an identifier of a payment instrument such as a credit card number, and/or various other information.

An action 204, performed by the merchant support service 108, comprises receiving the transaction request. In response to receiving the transaction request, the merchant support service 108 performs an action 206 of selecting a set of Internet or other network domain names and an action 208 of sending the selected domain names to the POS application 104 for domain name resolution by the POS application 104 using Internet-based or other network-based DNS services. The domain names may be selected from a predetermined list of appropriate domain names associated with websites or services that are known to use location-aware DNS strategies to direct Internet client traffic to servers that are nearest the clients. In some cases, the domain names may be randomly selected from the predetermined list, and therefore varied with each received transaction request. In other cases, the entire list of multiple predetermined domain names may be selected and sent in response to each transaction request.

The number of domain names sent to the POS application 104 may vary depending on implementation. In some cases, only a single domain name may be sent in response to each transaction request. In other cases, multiple domain names may be sent to the POS application 104 in response to a transaction request.

Note also that although the method 200 is described as being initiated by a transaction request, the actions described with respect to domain name lookup and IP address geolocation may be performed as a preliminary procedure in authorizing the POS application 104 and associated POS device 102 for operations, after which multiple transaction requests may be processed without further need for such domain name lookup and IP address geolocation.

The POS application 104 receives the set of domain names in an action 210, and in a subsequent action 212 resolves the domain names to determine respectively corresponding IP addresses. More specifically, the action 212 comprises calling the DNS resolver 118, which is supported by the operating system 106 of the merchant device 102, to resolve the multiple Internet domain names and to thereby determine the respectively corresponding IP addresses. For purposes of discussion, these IP addresses will be referred to as the resolved IP addresses.

Note that in some situations, calling the DNS resolver 118 to resolve the IP address corresponding to a particular domain name may cause the DNS resolver to retrieve the IP address from its cache 120. While this may be desirable in some situations, in other situations it may be desirable to instruct the DNS resolver 118 to clear the cache 120 prior to requesting the DNS resolver 118 to resolve the domain names.

An action 214 may be performed in some embodiments to determine propagation times between the merchant device 102 and the network hosts or servers corresponding to the resolved IP addresses. For example, the action 214 may comprise sending an ICMP (Internet Control Message Protocol) echo request to the network host represented by each resolved IP address, waiting for an ICMP echo reply, and measuring the time between sending the request and receiving the reply. The resulting measured signal propagation time may at times be referred to as a round-trip propagation time or round-trip delay time.

An action 216, performed by the POS application 104, comprises sending the resolved IP addresses to the merchant support service 108. In embodiments in which the action 214 is performed, the action 216 may also comprise sending the measured signal propagation times to the merchant support service 108. The merchant support service 108 receives the resolved IP addresses and the propagation times in an action 218.

An action 220, performed by the merchant support service 108, comprises determining geographic locations corresponding respectively to the resolved IP addresses. As an example, the action 220 may comprise referencing one or more geolocation databases 122 to determine the geographic locations corresponding to the IP addresses received from the POS application 104. As already described, the IP address locations are those locations from which the servers having the resolved IP addresses are believed to be operating.

The geolocation database 122 may in some cases be provided by a third-party service, available through the Internet 110, that can be queried to identify the location associated with any particular IP address. Looking up the locations of IP addresses is sometimes referred to as IP address geolocation.

The IP address locations may be reported in different ways and at different levels of specificity. For example, an IP address location may be reported generally as a region, such as a city, a state, a county, a province, a country, a continent, a multi-country region, a latitude-longitude block, an area corresponding to a postal code, etc. In some cases, an IP address location may be reported as a specific street address or area that is known to be within a more general region such as a city, a state, a county, a province, a country, a continent, a multi-country region, a latitude-longitude block, an area corresponding to a postal code, etc. Similarly, when an IP address is reported as being located at a specific location such as a street address or set of geographical coordinates, a corresponding region may be defined as a circular area of a given radius surrounding the specific location.

An action 222, performed by the merchant support service 108, comprises performing a check or comparison to verify that the reported IP address locations are consistent with the purported geographic region of the merchant device 102.

The check or comparison of the action 222 may be performed in various ways. For example, the action 222 may comprise determining whether all or most of the IP address locations are near or within the same geographic region as the purported geographic region of the merchant device 102. As another example, the IP address locations may be analyzed to estimate the actual location of the merchant device 102, such as by calculating a geographic center of the IP address locations, and the estimated actual location may be compared with the purported location or region of the merchant device 102.

As another example, where the IP address locations correspond to more general regions such as states, countries, circular areas, etc., these regions may be compared to identify an overlapping or intersecting area that is within most or all of the regions associated, and this area may be compared with the purported location or region of the merchant device 102.

In some embodiments, the measured propagation times may be used in combination with the IP address locations associated with the resolved IP addresses to determine or estimate the actual location of the merchant device 102 using triangulation techniques. For example, the propagation times can be taken as being proportional to the relative distances of the merchant device 102 from the respective IP address locations. Rather than calculating the geographic center of the locations, the merchant support service 108 may calculate an actual location that is between the IP address locations, such that the distances between the actual location and the IP address locations are proportional to the corresponding propagation times.

If the reported geographic locations are consistent with the purported geographic region of the merchant device 102, an action 224 is performed of allowing the transaction requested by the POS application 104. Although not shown in FIG. 2, this may involve further communications with the POS application 104. If the reported geographic locations are inconsistent with the purported geographic region of the merchant device 102, an action 226 is performed of denying the transaction requested by the POS application 104. Again, this may involve further communications with the POS application 104 that are not shown in FIG. 2.

The following is a non-exclusive list of examples that may result in denying the transaction:
- one or a threshold number of the returned IP address locations are not within the purported geographic region of the merchant device 102 or are further than a threshold distance from the purported location or region of the merchant device 102;
- the geographic center of the IP address locations is more than a threshold distance from the purported geographic location of the merchant device 102, is outside of the purported geographic region of the merchant device 102, or is more than a threshold distance from the geographic region of the merchant device 102;
- the calculated actual location of the merchant device 102 is more than a threshold distance from the purported geographic location of the merchant device 102, is outside of the purported geographic region of the merchant device 102, or is more than a threshold distance from the geographic region of the merchant device 102; and
- where the IP address locations comprise regions, the purported location or region of the merchant device 102 is outside the intersection of the regions or is more than a threshold distance outside the intersection of the regions.

There may be various other ways, in addition to those listed, of determining whether the returned IP address locations are consistent with the purported geographic region or location of the merchant device 102 or the POS application 104.

Figure 3:
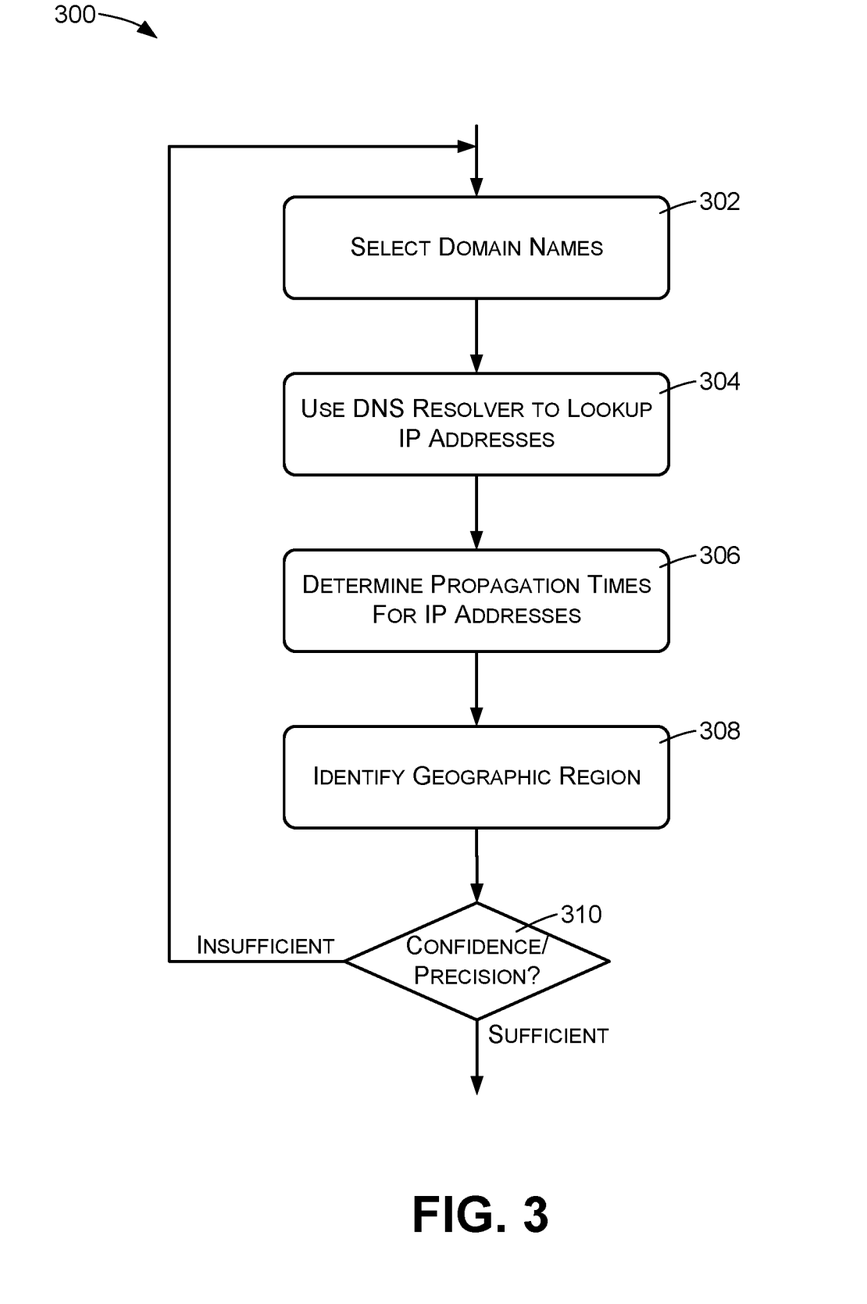
FIG. 3 is a flow diagram illustrating an example method of determining or estimating the location of a device.

FIG. 3 illustrates an example method 300 that may be used to determine a location or geographic region within which a device is located. The method 300 may be performed in conjunction with the system of FIG. 1 as well as in various other environments. In certain embodiments, a location or geographic region may be determined in accordance with the method 300 and then compared with the purported location of a POS device for purposes of fraud detection. A location or region determined in accordance with the method 300 may also be used for other purposes, such as for looking up services in the vicinity of the user, for social media check-in, for allowing or disallowing certain features or privileges to requesting applications depending on location, etc.

An action 302 comprises selecting one or more Internet or other network domain names. The domain names may be selected from a predetermined set of appropriate domain names associated with websites or services that are known to use location-aware DNS strategies to direct Internet client traffic to servers that are nearest the clients. In some cases, the domain names may be randomly selected from the predetermined list. The number of selected domain names may vary depending on implementation. In some cases, only a single domain name may be selected.

An action 304 comprises causing the device to perform DNS domain name resolution to determine one or more IP network addresses corresponding respectively to the set of Internet domain names. The DNS domain name resolution may be performed using a DNS resolver supported by the operating system of the device, for example, which may reference or query a DNS server specified by network settings of the device. In some cases, it may be desirable to clear the cache of the DNS resolver before performing the DNS domain name resolution. In other cases, it may be desirable to perform the DNS domain name resolution by referring directly to the DNS cache.

An action 306, which may be performed in certain embodiments, comprises measuring a propagation time of a signal between the device and each of the servers represented by the resolved IP network addresses. This may be performed, for example, by sending an ICMP echo request to the network host represented by each resolved IP address, waiting for an ICMP echo reply, and measuring the time between sending the request and receiving the reply. The propagation time measurement corresponding to a particular network address is the propagation time of a signal between the device and a network host having the particular network address.

An action 308 comprises identifying a geographic region that includes the location of the device, based at least in part on the locations corresponding to the resolved IP addresses, and in some embodiments also based on the measured propagation times. As an example, the action 308 might comprise selecting a geographic region that encompasses all of the IP address locations. As another example, the action 308 might comprise calculating the geographic center of the IP address locations. In cases where each IP address corresponds to a region, the action 308 may comprise identifying an intersection of the regions, and the location of the device may be taken as being within the intersection of the regions. Similarly, the location of the device may be taken as being at the geographic center of such an intersection. As another example, the geographic centers of the regions may be determined, and the location of the device may be taken as being between and equidistant from the geographic centers.

As yet another example, the action 308 might comprise calculating an actual location based on the IP address locations and the propagation times corresponding to the IP address locations. For example, a location between the IP address locations may be calculated such that the distances between the location and the IP address locations are proportional to the corresponding propagation times.

An action 310 comprises determining whether the location or region of the device has been calculated or otherwise determined with sufficient confidence or precision. For example, the action 310 may comprise determining whether a geographic region corresponding to the location of the device has been determined with a confidence that less than or greater than a desired confidence threshold. A level of confidence may be determined, as an example, by whether the locations corresponding to the resolved IP addresses are consistent with each other, such as by being relatively near each other or within contiguous geographical regions. If the determined confidence level is less than the desired confidence threshold, the actions 302, 304, 306, and 308 may be repeated using additionally selected domain names to re-determine and further refine the identification of the geographic region within which the device is located. For example, the action 302 may be repeated to select additional Internet domain names. The action 304 may be repeated to cause the device to perform additional DNS domain name resolution to determine additional IP addresses corresponding to the additional Internet domain names. The action 306 may be repeated to cause the device to perform additional propagation time measurements with respect to the additional Internet domain names. The action 308 may be repeated to re-determine the geographic region within which the device is located. These actions may be repeated any number of times in order to obtain the desired confidence level.

As another example, the action 310 may comprise determining whether the geographic region that has been calculated as corresponding to the location of the device is greater than or less than a desired size threshold. If the calculated geographic region is insufficiently precise and/or not small enough, the actions 302, 304, 306, and 308 are repeated using additionally selected domain names to re-determine and further refine the geographic region within which the device is located. For example, the action 302 may be repeated to select additional Internet domain names. The action 304 may be repeated to cause the device to perform additional DNS domain name resolution to determine additional IP addresses corresponding to the additional Internet domain names. The action 306 may be repeated to cause the device to perform additional propagation time measurements with respect to the additional Internet domain names. The action 308 may be repeated to re-determine the geographic region within which the device is located. These actions may be repeated any number of times in order to obtain the desired level of precision for the likely geographic area of the device.

Services may be provided or denied based on the determined location of the device as already described, depending on whether the determined location is consistent with the purported or allowed location of the device.

Figure 4:
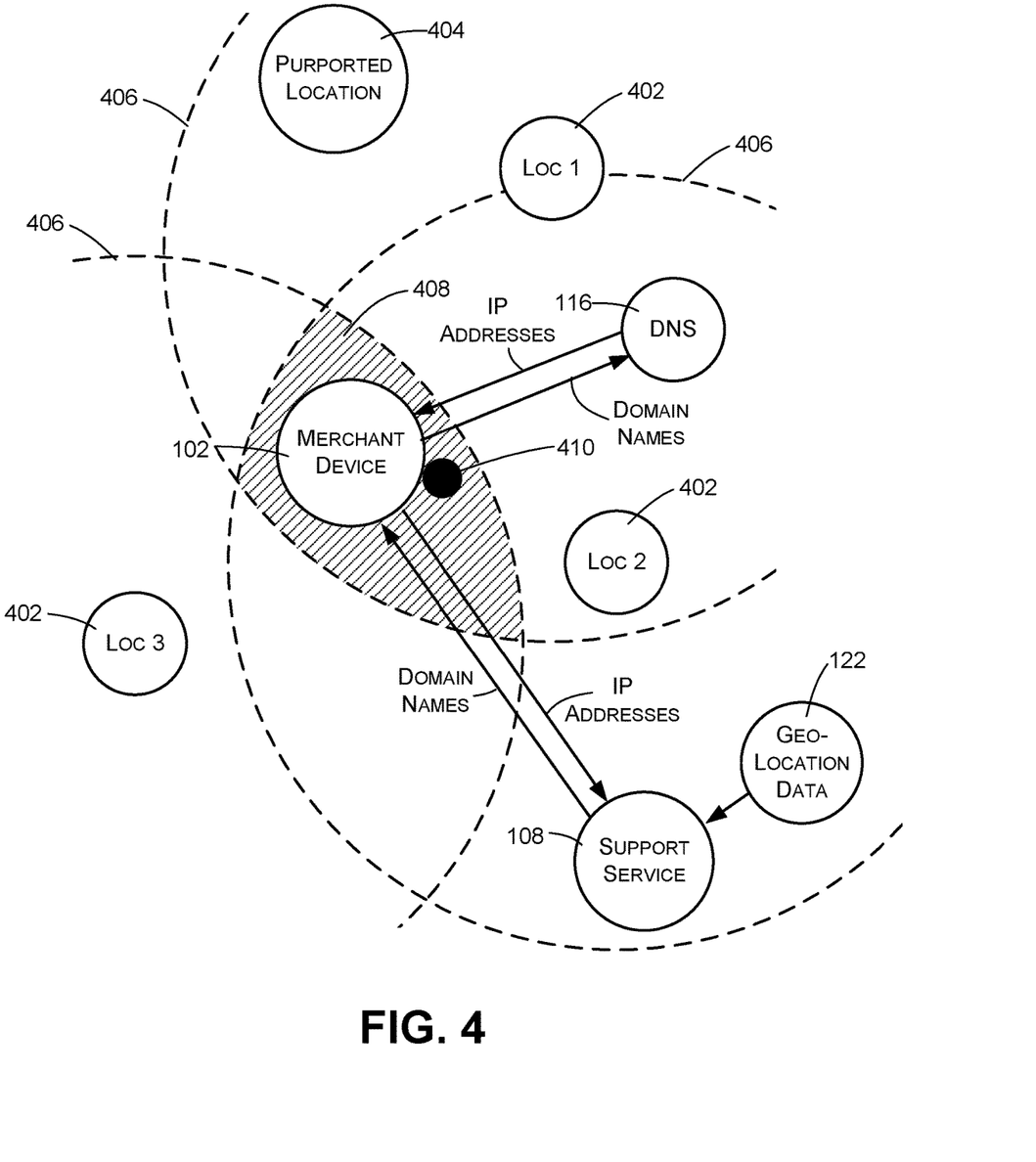
FIG. 4 is a diagram illustrating relative locations of various entities that may be involved in when determining or estimating the location of a device.

FIG. 4 illustrates an example of how reported geographic locations corresponding to specified Internet domain names may be used to determine an approximate location of the merchant device 102. FIG. 4 is a two-dimensional map showing relative locations of the merchant device 102 and locations 402 corresponding the IP addresses returned by the DNS server 116 to the merchant device 102.

For purposes of illustration, FIG. 4 also shows the support service 108, the DNS server 116, and the geolocation database 122, although the locations of these entities are not necessarily relevant to determining the location of the merchant device 102. The example of FIG. 4 also shows a purported location 404 of the merchant device, which is different than the illustrated actual location of the merchant device 102.

In this example, circles 406 have been constructed concentrically with each of the respective reported locations 402. The circles define geographic regions of the reported locations 402. An intersection or overlapping area 408 of the circles is also shown by hatching. In some embodiments, the merchant device 102 is considered to be located within or near the overlapping area 408.

In some embodiments, the circles 406 may have identical radii. In other embodiments, the radii of the circles 406 may be proportional to the measured propagation times between the merchant device 102 and the locations 402.

In some embodiments, rather than defining the geographic regions in terms of radii from the corresponding locations 402, any particular one or more of the regions may comprise a recognized geographic region, such as a city, a city block, a county, a state, a municipality, a latitude-longitude block, a continent, a jurisdiction, an area corresponding to a postal code, etc. In some cases, all of the regions may comprise such recognized geographic regions, and the overlapping area 408 may comprise the area where all of the regions overlap. In other cases, some of the regions may comprise such recognized geographic regions, others the regions may be defined by appropriate radii, and the overlapping area 408 may comprise the area where these differently defined regions overlap.

FIG. 4 also illustrates an alternative technique, where the merchant device 102 is considered to be at or near a calculated point 410. In certain embodiments, the point 410 may represent the geographic centroid of the reported locations 402. In other situations or embodiments, the point 410 may be calculated instead based on the measured propagation times between the merchant device 102 and the servers at the locations 402.

Figure 5:
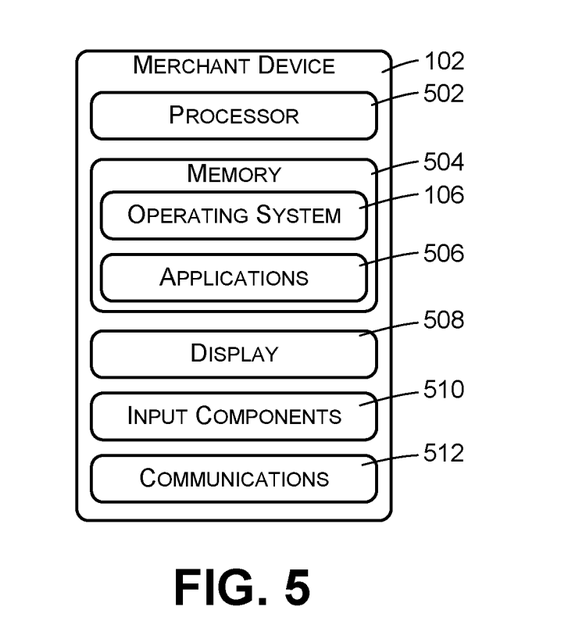
FIG. 5 is a block diagram of an example merchant device.

FIG. 5 shows example components of a merchant device 102 that may be used in the environment described herein. Generally, the merchant device 102 may comprise any type of computerized device that has or can be associated with a graphical display upon which visual content can be shown. Examples of such devices include personal computers, smartphones, tablet computers, laptop computers, projection systems, television systems, and so forth.

In the illustrated example, the merchant device 102 includes at least one processor 502 and associated memory 504. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some cases, the processor 502 may be one or more hardware processors and/or logic circuits of any suitable type specifically programmed or configured to execute the algorithms and processes described herein. The processor 502 can be configured to fetch and execute computer-readable processor-executable instructions stored in the memory 504.

Depending on the configuration of the merchant device 102, the memory 504 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 504 may include, but is not limited to, RAM, ROM, EEPROM, flash memory, solid-state storage, magnetic disk storage, optical storage, and/or other computer-readable media technology. Further, in some cases, the merchant device 102 may access external storage, such as RAID storage systems, storage arrays, network attached storage, storage area networks, cloud storage, or any other medium that can be used to store information and that can be accessed by the processor 502 directly or through another computing device or network. Accordingly, the memory 504 may be computer storage media able to store instructions, modules or components that may be executed by the processor 502. Further, when mentioned, non-transitory computer-readable media exclude media such as energy, carrier signals, electromagnetic waves, and signals per se.

The memory 504 may be used to store and maintain any number of functional components that are executable by the processor 502. In some implementations, these functional components comprise instructions or programs that are executable by the processor 502 and that, when executed, implement operational logic for performing the actions and services attributed above to the merchant device 102.

In the context of the examples described above, functional components of the merchant device 102 stored in the memory 504 may include the operating system 106, which is for controlling and managing various functions of the merchant device 102. As described above, the operating system 106 may include the communication stack 112 and the DNS resolver 118 shown in FIG. 1. The settings 114 and the cache 120 of the operating system 106 may also be maintained in the memory 504.

The memory 504 may also store one or more applications 506, such as may be used to provide POS functionality and/or to expose the POS functionality enabled by the merchant support service 108. The POS application 104 (FIG. 1) is an example of the applications 506 that may be stored in the memory 504. The memory 504 may also store additional data, data structures, and the like, not shown, that are used in the course of operations of the merchant device 102 and its components.

The merchant device 102 may have or be associated with a display component 508 upon which received content is displayed. The display component 508 may be integral to the merchant device 102 or may be connected to or otherwise associated with the merchant device 102.

The merchant device 102 may have various input components 510, which may include a keyboard, a mouse, a stylus, a touch screen, etc. One or more of the input components 510 may be used to perform selection of control elements within displayed content.

The merchant device 102 may have a network communications interface 512, such as an Ethernet communications interface, which provides communication by the merchant device 102 with various network-based or Internet-based servers, including the merchant support service 108.

The merchant device 102 may of course include many other logical, programmatic, and physical components that are not specifically described herein.

Figure 6:
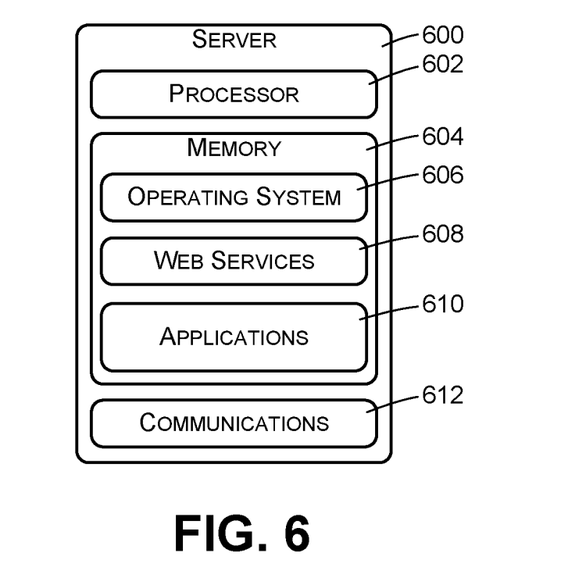
FIG. 6 is a block diagram of an example server computer.

FIG. 6 shows an example of a server computer 600, one or many of which may be used to implement the merchant support service 108. In the illustrated example, each server computer 600 includes at least one processor 602 and associated memory 604. Each processor 602 may itself comprise one or more processors or processing cores. For example, the processor 602 can be implemented as one or more microprocessors, microcomputers, microcontrollers, digital signal processors, central processing units, state machines, logic circuitries, and/or any devices that manipulate signals based on operational instructions. In some cases, the processor 602 may be one or more hardware processors and/or logic circuits of any suitable type specifically programmed or configured to execute the algorithms and processes described herein. The processor 602 can be configured to fetch and execute computer-readable processor-executable instructions stored in the memory 604.

Depending on the configuration of the server computer 600, the memory 604 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 604 may include, but is not limited to, RAM, ROM, EEPROM, flash memory, solid-state storage, magnetic disk storage, optical storage, and/or other computer-readable media technology. Further, in some cases, the server computer 600 may access external storage, such as RAID storage systems, storage arrays, network attached storage, storage area networks, cloud storage, or any other medium that can be used to store information and that can be accessed by the processor 602 directly or through another computing device or network. Accordingly, the memory 604 may be computer storage media able to store instructions, modules or components that may be executed by the processor 602. Further, when mentioned, non-transitory computer-readable media exclude media such as energy, carrier signals, electromagnetic waves, and signals per se.

The memory 604 may be used to store and maintain any number of functional components that are executable by the processor 602. In some implementations, these functional components comprise instructions or programs that are executable by the processor 602 and that, when executed, implement operational logic for performing the actions and services attributed above to the merchant support service 108.

In the context of the examples described above, functional components of the server 600 stored in the memory 604 may include an operating system 606 for controlling and managing various functions of the server 600. The memory 604 may also store a web services component 608. The web services component 608 is responsible for receiving content requests from various networked client devices and providing content in response to such requests. The memory 604 may also store various applications 610 that implement the merchant service functionality described herein.

The server 600 may have a network communications interface 612, such as an Ethernet communications interface, which provides communication by the server 600 with other servers and with client devices such as the merchant device 102.

The server 600 may of course include many other logical, programmatic, and physical components that are not specifically described herein.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving a request, communicated over the Internet from a point-of-sale (POS) device associated with a merchant, to initiate a purchase transaction between the merchant and a customer, wherein the POS device is associated with a purported geographic region;
   sending multiple Internet domain names to the POS device for domain name resolution by the POS device using Internet-based domain name system (DNS) services;
   receiving, from the POS device, multiple Internet Protocol (IP) addresses corresponding to the multiple Internet domain names that have been resolved by the POS device using the Internet-based DNS services;
   referencing one or more IP address geolocation databases to determine geographic locations corresponding to individual respective IP addresses of the multiple IP addresses;
   determining that one or more of the geographic locations are not within the purported geographic region; and
   denying the request to initiate the purchase transaction in response to determining that one or more of the geographic locations are not within the purported geographic region.

2. The method of claim 1, further comprising:
   receiving, by the POS device, the multiple Internet domain names; and
   calling a DNS resolver supported by an operating system of the POS device to resolve the multiple Internet domain names.

3. The method of claim 1, wherein the multiple Internet domain names are randomly selected from a predetermined set of Internet domain names.

4. The method of claim 1, further comprising:
   receiving propagation measurements from the POS device for the individual respective IP addresses of the multiple IP addresses, wherein a propagation measurement for a particular IP address corresponds to a signal propagation time between the POS device and an Internet host having the respective IP address;
   analyzing the propagation measurements to determine an estimated location of the POS device;
   determining that the estimated location is not within the purported geographic region; and
   denying the request to initiate the purchase transaction in response to determining that the estimated location is not within the purported geographic region.

5. A system, comprising:
   one or more processors;
   one or more non-transitory computer-readable media storing instructions executable by the one or more processors, wherein the instructions program the one or more processors to perform actions comprising:
      receiving a request, communicated over the Internet from a point-of-sale (POS) device of a merchant to initiate a transaction between the merchant and a customer, wherein the POS device is associated with a purported geographic region;

sending one or more network domain names to the POS device for domain name resolution by the POS device using network-based domain name system (DNS) services;
receiving, from the POS device, one or more network addresses corresponding to the one or more network domain names that have been resolved by the POS device using the network-based DNS services;
referencing one or more network address geolocation databases to determine one or more geographic locations corresponding to individual respective network addresses of the one or more network addresses;
determining that the POS device is not within the purported geographic region based at least in part on the one or more geographic locations; and
denying the request in response to determining that the POS device is not within the purported geographic region.

6. The system of claim 5, wherein determining that the POS device is not within the purported geographic region comprises determining a geographic center of the one or more geographic locations and determining that the geographic center is not within the purported geographic region.

7. The system of claim 5, wherein determining that the POS device is not within the purported geographic region comprises determining that at least one geographic location of the one or more geographic locations is not within the purported geographic region.

8. The system of claim 5, wherein the one or more geographic locations correspond respectively to regions, and wherein determining that the POS device is not within the purported geographic region comprises:
identifying an intersecting area of the one or more geographic locations; and
comparing the purported geographic region with the intersecting area.

9. The system of claim 5, the actions further comprising calling, by the POS device, a DNS resolver supported by an operating system of the POS device to resolve the one or more network domain names.

10. The system of claim 9, the actions further comprising clearing a cache of the DNS resolver before calling the DNS resolver.

11. The system of claim 5, the actions further comprising using, by the POS device, a DNS server specified by operating system settings of the POS device to resolve the one or more network domain names.

12. The system of claim 5, wherein the one or more network domain names are randomly selected.

13. The system of claim 5, the actions further comprising:
measuring one or more propagation times corresponding respectively to the individual respective network addresses of the one or more network addresses, wherein a propagation time corresponds to a signal propagation time between the POS device and a network host having the respective network address;
analyzing the one or more propagation times to determine an estimated location of the POS device;
determining that the estimated location of the POS device is not within the purported geographic region; and
denying the request in response to determining that the estimated location of the POS device is not within the purported geographic region.

14. One or more non-transitory computer-readable media storing instructions executable by one or more processors, wherein the instructions program the one or more processors to perform acts comprising:

receiving a request, communicated over the Internet from a point-of-sale (POS) device of a merchant to initiate a transaction between the merchant and a customer, wherein the POS device is associated with a purported geographic region;
sending one or more network domain names to the POS device for domain name resolution by the POS device using network-based domain name system (DNS) services;
receiving, from the POS device, one or more network addresses corresponding to the one or more network domain names that have been resolved by the POS device using the network-based DNS services;
referencing one or more network address geolocation databases to determine one or more geographic locations corresponding to individual respective network addresses of the one or more-network addresses;
determining that the POS device is not within the purported geographic region based at least in part on the one or more geographic locations; and
denying the request in response to determining that the POS device is not within the purported geographic region.

15. The one or more non-transitory computer-readable media of claim 14, wherein determining that the POS device is not within the purported geographic region comprises determining a geographic center of the one or more geographic locations and determining that the geographic center is not within the purported geographic region.

16. The one or more non-transitory computer-readable media of claim 14, wherein determining that the POS device is not within the purported geographic region comprises determining that at least one geographic location of the one or more geographic locations is not within the purported geographic region.

17. The one or more non-transitory computer-readable media of claim 14, wherein the one or more geographic locations correspond respectively to regions, and wherein determining that the POS device is not within the purported geographic region comprises: identifying an intersecting area of the one or more geographic locations; and comparing the purported geographic region with the intersecting area.

18. The one or more non-transitory computer-readable media of claim 14, wherein the acts further comprise:
calling, by the POS device, a DNS resolver supported by an operating system of the POS device to resolve the one or more network domain names.

19. The one or more non-transitory computer-readable media of claim 18, wherein a cache of the DNS resolver is cleared before calling the DNS resolver.

20. The one or more non-transitory computer-readable media of claim 14, wherein the acts further comprise using, by the POS device, a DNS server specified by operating system settings of the POS device to resolve the one or more network domain names.

21. The one or more non-transitory computer-readable media of claim 14, wherein the one or more network domain names are randomly selected.

22. The one or more non-transitory computer-readable media of claim 14, wherein the acts further comprise:
measuring one or more propagation times corresponding respectively to the individual respective network addresses of the one or more network addresses, wherein a propagation time corresponds to a signal propagation time between the POS device and a network host having the respective network address;

analyzing the one or more propagation times to determine an estimated location of the POS device;

determining that the estimated location is not within the purported geographic region; and denying the request in response to determining that the estimated location is not within the purported geographic region.

23. The one or more non-transitory computer-readable media of claim 14, wherein the individual respective network addresses of the one or more network addresses comprise one or more Internet Protocol (IP) addresses.

* * * * *